United States Patent Office 3,290,122
Patented Dec. 6, 1966

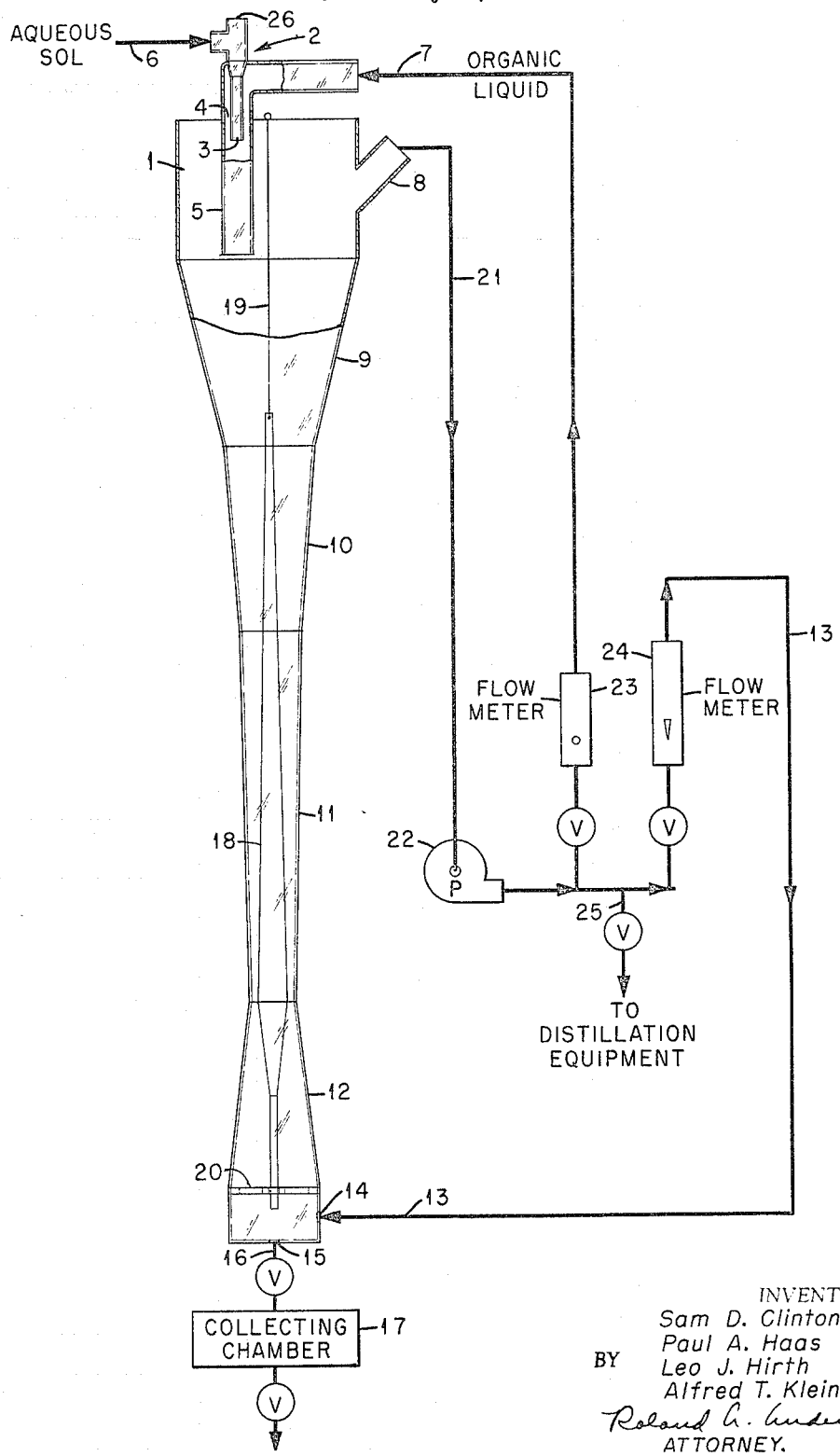

3,290,122
PROCESS FOR PREPARING OXIDE GEL
MICROSPHERES FROM SOLS
Sam D. Clinton, Oak Ridge, and Paul A. Haas, Knoxville, Tenn., Leo J. Hirth, Boulder, Colo., and Alfred T. Kleinsteuber, Oak Ridge, Tenn., assignors to the United States of America as represented by the United States Atomic Energy Commission
Filed July 28, 1964, Ser. No. 385,813
15 Claims. (Cl. 23—345)

This invention relates to fuel and fertile materials for nuclear reactors and more particularly to a process and apparatus for preparing said materials in the form of oxide or carbon-containing oxide microspheres from sols.

One of the most promising approaches to the processing of ceramic nuclear fuels has been the "sol-gel" process wherein an oxide of a fertile and/or fissionable element, for example, mixed thorium-uranium oxide, is prepared in the form of an aqueous sol and the sol is dehydrated under controlled conditions to produce oxide gel fragments, which are then fired to a high density. This process is advantageous because of its inherent simplicity, its capability for control of particle size and shape, and the relatively low required firing temperature. Oxide gel fragments produced by this means have exhibited superior properties for fuel element applications, namely, a density near theoretical, uniform distribution of fissionable material and stability under irradiation.

The sol-gel process was initially developed for the preparation of irregularly shaped, glass-like oxide fragments for fabrication by vibratory compaction, the fragments being formed by cracking of the gel upon drying. In subsequent embodiments this process has been adapted to the preparation of carbides by incorporating carbon in the sol and to the preparation of spherical particles by forming the sol into droplets and congealing the droplets.

The methods employed for preparing spherical particles, however, have not proven satisfactory for producing large quantities of material with properties suitable for nuclear applications. A uniform particle size in the range of 50 to 1000 microns, and typically 100 to 250 microns, is required for these particles, along with a high density, smooth surface and high strength.

Oxide gel microspheres have been prepared from sols by dispersing the sol in a water-immiscible liquid such as carbon tetrachloride, the liquid being agitated at a controlled rate to produce the desired particle size, and congealing the dispersed droplets by addition of an organic liquid drying agent such as isopropyl alcohol. While this method is useful for small amounts of material, its operation is necessarily batchwise, and attempts to scale it up have been unsuccessful because of non-uniformity and lack of effective control over particle size. In addition, handling of liquids is complicated by the formation of a ternary azeotrope. Sol droplets have also been formed by dispersing the sol into the organic liquid through a jet orifice, with droplet size being controlled by the orifice diameter. At fired particle sizes less than 500 microns this method is ineffective because of recurrent plugging of the required small orifice by the viscous sol.

Several features are important in obtaining effective process operation in the preparation of gel microspheres from sols. A controllable means for dispersing the sol into droplets of the proper size is required, and the droplet size should not depend on the dispersing orifice diameter for particles under 500 microns in size. The properties of the medium into which the sol is dispersed must be such as to allow both the formation of spherical droplets and removal of water from the droplets. In previous methods one organic liquid was employed as the dispersing medium and a second liquid of different composition was added to congeal the droplets. Process operation would be simplified by the use of a single liquid to perform both functions. Suitable contact between the congealing particles and the liquid is also essential, and the use of a column or similar apparatus adaptable to continuous operation is desired.

It is therefore an object of this invention to provide a process for preparing fertile and fissionable material in the form of oxide gel microspheres 50 to 1000 microns in diameter from sols.

Another object is to provide a process for preparing said microspheres in which the particle size of dispersed sol droplets is controlled at a uniform, predetermined value.

Another object is to provide a process for preparing said microspheres wherein the same organic liquid phase is employed for forming and congealing sol droplets.

Another object is to provide a continuous process for preparing said microspheres on a large scale.

Another object is to provide a process for preparing gel microspheres having high sintered density and strength.

Another object is to provide a process for preparing carbon-containing oxide gel microspheres from sols.

Another object is to provide an apparatus for preparing said microspheres.

Other objects and advantages of this invention will be apparent from the following detailed description and claims.

In accordance with out invention oxide gel microspheres are prepared from a hydrous oxide sol by forming the sol into droplets of a predetermined size in an organic liquid having a water solubility of 0.3 to 10 volume percent and containing a surface active agent, maintaining the droplets in contact with the organic liqud until they are fully congealed and recovering the resulting congealed particles. The same liquid phase serves as the droplet-forming medium and congealing medium in this process so that handling of liquid is simplified. Effective control of particle size in the range of 50 to 1000 microns is obtained by concurrently introducing a fine stream of the sol and a surrounding stream of the organic liquid into a droplet-forming zone, the flow rate of the organic liquid being substantially higher than the sol flow rate and adjusted to a predetermined value in relation to the sol flow rate whereby droplets of a controlled size are formed. The congealing sol droplets are readily maintained in contact with the organic liquid by passing them downward through a vertically extending zone countercurrent to a second stream of the organic liquid under conditions such that they settle when they became fully densified. Gel microspheres prepared by this process are smooth and uniform, and upon being sintered they exhibit the high density and mechanical strength necessary for fuel element applications. This process may be operated batchwise or continuous, and it is amenable to large-scale use, the previous difficulties of orifice plugging and non-uniform particle size being avoided.

This invention will be best understood by reference to the drawing which is a schematic view partly in section of apparatus in which the process defined herein can be practiced.

In the embodiment illustrated in the drawing, the apparatus is composed of a tapered column having a cylindrical disengagement chamber 1 at the top. A two-fluid nozzle 2 having a central aperture 3 and a coaxial annular aperture 4 is disposed at the top of the chamber. The two-fluid nozzle is enlarged in this view to show its operation in detail. Elongated tubular member 5, a continuation of the outer wall of the annular aperture, extends downward into chamber 1. The sol is introduced through a suitable line 6 and central nozzle aperture 3, and the organic liquid is introduced through line 7 and annular aperture 4. The sol is formed into droplets by the flow of the two liquids through tubular member 5. An upwardly inclined overflow pipe 8 extends from the wall of chamber 1 for removal of the effluent liquid stream. The top section 9 of the column is tapered outwardly to provide a decrease in flow rate and thus prevent removal of newly formed, less-dense droplets through the overflow. Sections 10 and 11 are tapered slightly, 2.4° and 0.6° from the vertical, respectively, to maintain the congealing particles in suspension until their density is increased by extraction of water. Section 12 is tapered outward to allow the densified particles to settle. The organic liquid is introduced through line 13 and aperture 14 located slightly above the base of the column. The settled particles are removed through aperture 15 at the bottom of the column and valved line 16 leading to collecting chamber 17. A tapered rod 18, held in position by a wire 19 and ribbed plate 20, is provided within the column to equalized the diametral liquid flow profile and maintain the congealing particles in suspension. The liquid effluent is removed from overflow 8 through line 21, and the bulk of the liquid is recycled to feed lines 7 and 13 by means of a pump 22 and flowmeters 23 and 24. A portion of the liquid is regenerated by passage through line 25 leading to distillation equipment (not shown). A cleanout port 26 is provided at the top of the nozzle to allow access to central aperture 3 in the event of plugging.

The process and apparatus of our invention are applicable to the preparation of gel microspheres from stable actinide oxide sols, and particularly the sols employed in previous embodiments of the sol-gel process, namely, thorium oxide, thorium-uranium oxide, thorium-plutonium oxide and mixtures thereof with carbon. The chemical composition of the sol is critical only to the extent that it contributes to the stability of the sol, and any oxide which forms a stable hydrous sol may be spheroidized by this means. Although the description given below is primarily with reference to oxides containing thorium oxide as the major component, the invention is not to be understood as so limited.

The critical features of a stabilized thorium oxide sol starting material for the present invention are a nitrate-to-thorium ratio of .05 to .15 and a pH of 2.0 to 4.5, these conditions being necessary for sol stability, and a thorium oxide concentration of about 2 to 5 molar. At higher concentrations size control becomes difficult, and at lower concentrations the product particles exhibit excessive porosity and distorted shape. The thorium oxide sol may be prepared from a thorium nitrate solution, which is the normal product of nuclear fuel purification processes, by evaporating the bulk of the water and contacting the resulting oxide with superheated steam at a maximum temperature of 475° C. Thorium oxide prepared in this manner is readily incorporated in a sol by digesting in dilute nitric acid, the pH and nitrate concentration being adjusted to the values given above. Up to 10 mole percent uranium oxide or 5 mole percent plutonium oxide may be provided to obtain mixed oxides, these materials being added as uranyl or plutonyl nitrate.

Carbon-containing oxide microspheres for conversion to carbides are prepared in another embodiment of this invention. Finely divided carbon is added to the starting sol and blended to form a homogeneous dispersion, and the remaining steps in the process are substantially the same as for thorium oxide alone. For this embodiment a relatively low oxide concentration of about 2 molar is preferred. For preparation of dicarbides the carbon is added at a proportion sufficient to provide a carbon-to-metal molar ratio of at least 4 to 1, and preferably about 4.4 to 1. For monocarbides a carbon-to-metal molar ratio of 3 to 1 is employed. The term "finely divided carbon" as used herein is intended to refer to carbon having a mean particle size not exceeding 400 angstroms, as determined by X-ray diffraction. Commercially available carbon designated as "channel black" is suitable for this purpose. Since uranium is adsorbed on the surface of the carbon instead of on the thorium oxide, higher proportions of uranium may be added to carbon-containing sols than to carbon-free thorium oxide sols, which become unstable at uranium concentrations over 10 mole percent. Uranium may comprise up to 20 mole percent of the total metal values for the carbon-containing sols.

The water-extraction capacity of the organic liquid is critical to the formation of sound particles by gradual removal of water. A solubility of water in the organic liquid of 0.3 to 10 volume percent is required, and 1 to 7 volume percent is preferred. At higher water solubilities extraction of water is too rapid, resulting in fragmentation, coalescence, particle weakness and distorted shapes. Lower solubilities cause clustering of particles and uneconomically slow operation. Solubility of the organic liquid in water must be less than 1 volume percent, and preferably below 0.5 volume percent, to avoid weakness and a tendency to cracking or crumbling during drying of the particles. Other properties required in the organic liquid are an interfacial tension with water greater than 4 dynes per square centimeter for particles over 100 microns in diameter and over 2 dynes per square centimeter for smaller particles and amenability to removal of water. A solvent which forms a binary azeotrope with water and which is chemically stable during distillation is preferred to allow convenient water removal. Although not critical, a relatively high viscosity consistent with the above properties is also preferred for enhanced stability in the movement of particles through the congealing zone. Any organic solvent which meets these criteria may be employed. Primary alcohols having 6 to 8 carbon atoms, for example, 2-ethyl hexanol-1 and 2-methyl pentanol-1, are preferred. Other suitable solvents are simple esters of carboxylic acids such as 2-ethyl hexyl acetate and ethyl benzoate.

A surface-active agent is provided in the organic liquid to prevent coalescence of the sol droplets and wetting of the column wall. Numerous commercially available surface-active agents may be employed, but most of these agents are not effective over the entire range of particle sizes or sol compositions covered by the present process. Several such agents and the conditions under which they are effective are listed below. An agent for a particular particle size and composition may be selected by reference to this listing. The particle sizes therein refer to sintered particle size. The selected agent is normally provided in the organic liquid at a concentration of 0.1 to 10 volume percent.

"Ethomeen S-15" (an ethylene oxide condensation product of the primary fatty tertiary amines)—50 to 1000 microns, for thorium oxide and thorium-uranium oxide. This agent at a concentration of 0.2 to 0.3 volume percent is preferred for thorium oxide.

"Span 80" (sorbitan monooleate, sorbitan being a mixture of esters of the sugar alcohols sorbitol and mannitol in which the sorbitol portion of the molecule is partially esterified and partially dehydrated before esterification to form the cyclic inner ethers monohydrosorbitol and dianhydrosorbitol)—50 to 300 microns, for thorium oxide, thorium-uranium oxide and thorium or thorium-uranium oxide-carbon.

"Paraplex G-62" (an ethylene-oxide-treated soybean oil in the form of a polyester)—500 to 1000 microns for thorium oxide, thorium-uranium oxide and thorium or thorium-uranium oxide-carbon.

"Hodag 40-R" (a high-molecular-weight ester)—500 to 1000 microns for thorium oxide, thorium-uranium oxide and thorium or thorium-uranium oxide-carbon.

Octanol-2—500 to 1000 microns for thorium oxide, thorium-uranium oxide and thorium or thorium-uranium oxide-carbon. This agent at a proportion of 5 to 10 volume percent is preferred for carbon-containing compositions since it is the most effective in preventing shedding of carbon particles during gel formation.

The sol is formed into droplets of a controlled size in the organic liquid described above. For particles over 500 microns in diameter the previously known method of introducing the sol into the organic phase through a jet orifice, the droplet diameter being controlled by the orifice diameter, may be used. For particles under 150 microns in diameter the sol droplets may be formed by dispersing the sol into the organic liquid while the organic liquid is being agitated at a controlled rate to obtain the desired droplet size. It is preferred, however, to use the droplet-forming method described below wherein a fine stream of the sol and a surrounding stream of the organic liquid are simultaneously introduced into a suitable vessel.

In the preferred procedure sol droplets are produced by concurrently introducing a fine stream of the sol and a surrounding stream of the organic liquid into a droplet-forming zone through a central aperture and a concentric annular aperture, the flow rate of the organic liquid being substantially greater than the sol flow rate. The sol is accelerated to the driving fluid velocity and is broken to form droplets, the size of which is determined by the following relationship:

$$D = \frac{2.3f}{F} A$$

where $D$ = sol droplet diameter, $f$ = sol flow rate, $F$ = organic liquid flow rate, and $A$ = outer aperture diameter. The diameter of the central aperture through which the sol is introduced does not determine droplet diameter so that the plugging associated with very small orifices is avoided. It is preferred to use a sol flow rate of 0.5 to 10 cubic centimeters with the sol flow rate being varied in accordance with the above equation to produce the desired droplet size. A central aperture diameter of about 0.030 to 0.060 inch and an annular aperture diameter of 1/8 to 1/4 inch are preferred.

The dimensions of the droplet forming zone in this procedure are not critical and this zone may comprise the upper portion of the region enclosed by a column, with the lower portion of the column serving as a congealing zone. In order to avoid disturbance of the droplet-forming mechanism and loss of newly formed droplets by turbulence, it is preferred to encase the droplet forming zone with a tubular member which extends downward into the column for a distance of at least 6 inches. This member may be an extension of the outer wall of the annular aperture. For example, a tube or pipe extending downward into the column may be employed as the annular aperture, with a fine tubular member such as an ordinary hypodermic needle inserted in its center serving as the central aperture. A two-fluid nozzle such as a pneumatic atomizer may also be used to introduce the two liquid streams.

The sol droplets are then congealed by maintaining them in contact with the organic liquid. The organic liquid of the composition specified above extracts the water from the droplets gradually to produce gel particles which exhibit high density and strength upon being sintered. The minimum contact time required for fully congealing the particles varies with the particle size and composition. For relatively large particles 500 to 1000 microns in diameter and for carbon-containing particles, a contact time of about 20 minutes is required. For smaller, carbon-free particles the time is decreased, 250 micron and 50 micron particles requiring about 10 minutes and 5 minutes, respectively. As the water is removed the gel particles become denser, increasing from about 1.5 grams per cubic centimeter in the sol to above 4 grams per cubic centimeter in the fully congealed particle for thorium oxide.

The desired contact between the sol droplets and the organic liquid may be obtained by passing the droplets downward through a vertically extending congealing zone countercurrent to the flow of a second stream of the organic liquid introduced at the bottom of this zone. The design and dimensions of the congealing zone and the flow rate of the second organic stream are adjusted to maintain the particles in suspension and in contact with the organic stream for the required period. In a preferred embodiment the upper portion of this zone comprises an inverted frusto-conical section about 1 to 2 feet in length and tapered substantially, e.g., 5 to 10 degrees from the vertical to provide a decreased linear flow rate and allow disengagement of the particles from the effluent organic liquid. The middle portion of this zone is tapered downward slightly, e.g., 0.5 to 3 degrees from the vertical to maintain the particles in suspension as they become denser and until they attain a fully congealed density, e.g., at least 4 grams per cubic centimeter for thorium oxide. As pointed out above a contact time of at least 5 to 20 minutes is required. The lower portion of this zone is tapered outwardly at the bottom, e.g., about 5 degrees from the vertical, to allow the densified particles to be separated from the incoming second organic stream. Introduction of this stream through the side wall at a point slightly above the base also enhances separation.

Other fluidization techniques may be employed in the design of a congealing zone column to maintain the particles in suspension. In the embodiment illustrated in the accompanying drawing a tapered rod is provided at the column axis to restrict the flow of the organic stream in the middle region of the column.

The converging organic liquid streams are removed through an outlet, preferably an offset overflow pipe, above the congealing zone.

To provide continuous operation of the process the effluent organic liquid is split into two streams by means of a suitable piping arrangement and recycled to the original organic feed streams. A side stream of organic liquid, e.g., 5 volume percent, is removed and regenerated by separation of the extracted water. Conventional distillation is preferred, but other methods such as contacting the liquid with a water adsorbent such as silica gel may also be employed. For continuous operation it is preferred to maintain the water content of the organic liquid at a level below about 1/2 to 3/4 of the saturation concentration.

The gel microspheres which collect at the bottom of the congealing zone are removed and dried under mild conditions to remove the bulk of the water and adhering organic liquid prior to calcination. Steam drying at a temperature not exceeding 140° C. is preferred.

The dried microspheres are then fired to obtain the high density and strength required for fuel-element applications. The firing conditions employed for sol-gel particles prepared by previous methods may be employed. Preferred firing conditions are as follows: thorium oxide —four hours in air at 1150° C., thorium-uranium oxide— three hours in inert gas containing 4 percent hydrogen and thorium or thorium-uranium oxide-carbon—1 to 6 hours at 1450° C. to 1750° C. in inert gas or vacuum for conversion to dicarbide.

In the course of the present process the gel particles undergo substantial shinkage in accordance with the increase in density from about 0.5 to 1.25 grams per cubic centimeter in the sol to 4 to 5 in the congealed particle to a fired density of about 10 for thorium oxide. This shrinkage is taken into account in controlling particle size in the formation of microspheres.

Our invention is further illustrated by the following examples.

*Example 1*

The feasibility of forming oxide gel microspheres from a thorium oxide sol by concurrently introducing the sol and a surrounding organic liquid stream into a column was established by the following experiment. A 4.9 molar thorium oxide sol was fed through the central nozzle opening of a pneumatic atomizing nozzle at a rate of 1.4 cubic centimeters per minute. An organic liquid consisting of 0.25 volume percent "Sarkosyl O" (an anionic surfactant, oleyl sarcosine, having both carboxylic acid and amide radicals) in 2-ethyl hexanol was fed through the surrounding aperture at a rate of 440 cubic centimeters per minute. The central aperture diameter was 0.030 inch and the flow area of the surrounding aperture was $6.0 \times 10^{-2}$ square centimeters. The two streams were fed into a 3 inch diameter section of a column containing the same organic liquid. The resulting droplets were congealed by maintaining them in contact with the organic liquid for 10 to 15 minutes in a tapered section of the column (3 inches at the top of the section tapered to 1 inch diameter over a 24 inch length). The congealed microspheres were recovered and fired at 1150° C. Sixty-five (65) grams of oxide microspheres with a mean diameter of 250 microns were produced, 80 weight per cent having a diameter of 200 to 300 microns.

*Example II*

A column system having a volume of 2 liters was tested for the formation of droplets and amenability to continuous operation. The tapered column was 12 inches high and had an inner diameter of 1½ inches at the top and ½ inch at the bottom. A 4.9 M thorium oxide sol was introduced through a .006 inch diameter orifice at the top of the column, which contained an organic liquid comprising 2-ethyl hexanol and 0.1 volume percent Paraplex G-62. The first few droplets produced in the column indicated flow separation at the column wall, but as the droplet population increased, a stable bed of droplets was formed. Within 20 minutes at a sol flow rate of 15 to 20 cubic centimeters per hour two distinct layers, an upper layer of sol droplets and a layer of gelled particles 1 inch below the upper layer, were observed. The gelled particles were recovered and dried in air at 100° C. The gelled particles were highly uniform in shape and size, the unfired diameter being 650 to 750 microns. The stable action of the congealing particles in the column demonstrates the feasibility of continuous column operation.

*Example III*

A mixed oxide sol containing 2300 grams thorium oxide—8 weight percent uranium oxide was converted to gel microspheres by the following procedure. The tapered column apparatus illustrated in the drawing was employed. The minimum column diameter was 1½ inches and the widest diameter at the top was 6 inches. A two-fluid nozzle having a central aperture diameter of ³⁄₁₆ inch and an annular aperture outer diameter of ⁵⁄₁₆ inch was used to introduce the two streams. A ⁵⁄₁₆ inch tube was joined to the outer diameter of the nozzle and extended 10 inches downward into the column. The sol was introduced at a flow rate of 1.2 cubic centimeters per minute and the organic liquid, consisting of 2-ethyl hexanol containing 0.2 volume percent of the surface-active agent "Span-80," was introduced through the annular aperture at a flow rate of 300 cubic centimeters per minute. A second stream of the organic liquid, introduced at the base of the column, was circulated upward at a flow rate of one gallon per minute. Sol droplets were formed in the extending tube and the resulting congealing gel microspheres were maintained in suspension for a period of at least 10 to 15 minutes before they settled. The gel microspheres were removed, dried in air at 100° C., and fired at 1150° C. Particle size distribution of the fired microspheres was 55 weight percent in the range of 149 to 297 microns in diameter, 25 weight percent from 297 to 420 microns and the remainder smaller than 149 microns or larger than 420. The following physical properties were determined: mercury displacement density, 9.99 grams per cubic centimeter; surface area, 0.004 square meter per gram; average crushing strength of 25 particles, greater than 5710 grams. The fired particles were uniformly spherical in shape and had very smooth surfaces.

The above examples are merely illustrative and are not to be understood as limiting the scope of our invention which is limited only as indicated by the appended claims.

Having thus described our invention, we claim:

1. The process for preparing oxide gel microspheres from a stable hydrous oxide sol which comprises forming said sol into droplets in an organic liquid having a water solubility of 0.3 to 10 volume percent and a solubility in water less than 1 volume percent and containing a surface-active agent, maintaining the resulting droplets in contact with said liquid until said droplets are congealed and recovering the resulting congealed spherical particles.

2. The process for preparing oxide gel microspheres from a stable hydrous oxide sol which comprises concurrently introducing a fine stream of said sol and a surrounding stream of an organic liquid having a water solubility of 0.3 to 10 volume percent and a solubility in water less than 1 volume percent and containing a surface-active agent into a droplet-forming zone, the flow rate of said organic liquid being substantially higher than the flow rate of said sol and adjusted to a predetermined value in relation to said sol flow rate whereby droplets of a predetermined size are formed, maintaining said droplets in contact with said organic liquid until the resulting gel microspheres are congealed and recovering said congealed microspheres.

3. The process for preparing oxide gel microspheres from a stable hydrous oxide sol which comprises concurrently introducing a fine stream of said sol and a surrounding stream of an organic liquid having a water solubility of 0.3 to 10 volume percent and a solubility in water less than 1 volume percent and containing a surface-active agent into a droplet forming zone, the flow rate of said organic liquid being substantially higher than the flow rate of said sol and adjusted to a predetermined value in relation to said sol flow rate whereby sol droplets of a predetermined size are formed, passing the resulting sol droplets downward through a vertically extending congealing zone, countercurrently passing a second stream of said organic liquid upward through said congealing zone, the dimensions of said congealing zone and the flow rate of said second stream being adjusted to maintain the resulting congealing gel microspheres in suspension until the density of said microspheres increases to a predetermined value whereby the resulting congealed microspheres settle and recovering said congealed microspheres.

4. The process for preparing high density actinide oxide gel microspheres of a controlled diameter from 50 to 1000 microns from a stable hydrous actinide oxide sol which comprises concurrently introducing a fine stream of said sol and a surrounding stream of an organic liquid having a water solubility of 0.3 to 10 volume percent and a solubility in water less than 1 volume percent and containing a surface-active agent into a droplet forming zone, the flow rate of said organic liquid being substantially higher than the flow rate of said sol and adjusted to a predetermined value in relation to the sol flow rate whereby droplets of a predetermined size are formed, passing the resulting sol droplets downward through a vertically extending congealing zone, countercurrently passing a second stream of said organic liquid upward through said congealing zone, the dimensions of said congealing zone and the flow rate of said second stream being adjusted to maintain the resulting congealing gel microspheres in suspension until the density of said microspheres increases to a predetermined value whereby the resulting congealed microspheres settle, recovering the resulting congealed microspheres and firing said congealed microspheres at an elevated temperature.

5. The process of claim 4 wherein the concentration of actinide oxide in said sol is 2 to 5 molar.

6. The process of claim 4 wherein the predominant portion of said actinide oxide is thorium oxide.

7. The process of claim 4 wherein said organic liquid is selected from the group consisting of primary alcohols having 6 to 8 carbon atoms and simple esters of carboxylic acid.

8. The process for preparing actinide carbide microspheres of a controlled size in the range of 50 to 1000 microns in diameter from a stable hydrous actinide oxide sol which comprises intimately mixing said sol with finely divided carbon, concurrently introducing a fine stream of the resulting carbon-containing sol and a surrounding stream of an organic liquid having a water solubility of 0.3 to 10 volume percent and a solubility in water less than 1 volume percent and containing a surface-active agent into a droplet-forming zone, the flow rate of said organic liquid being substantially higher than the flow rate of said carbon-containing sol and adjusted to a predetermined value in relation to said sol flow rate whereby carbon-containing sol droplets of a predetermined size are formed, passing the resulting droplets downward through a vertically extending congealing zone, countercurrently passing a second stream of said organic liquid upward through said congealing zone, the dimensions of said congealing zone and the flow rate of said second stream being adjusted to maintain the resulting congealing microspheres in suspension until the density of said microspheres increase to a predetermined value, whereby the resulting fully congealed microspheres settle, recovering said fully congealed microspheres, and firing said congealed microspheres at an elevated temperature in a non-oxidizing atmosphere whereby actinide carbide microspheres are formed.

9. The process of claim 8 wherein the concentration of actinide oxide in said sol is about 2 molar.

10. The process of claim 8 wherein said surface-active agent is octanol-2 at a proportion of 5 to 10 volume percent in said organic liquid.

11. The process of claim 8 wherein said organic liquid is selected from the group consisting of primary alcohols having 6 to 8 carbon atoms and simple esters of carboxylic acids.

12. The process of claim 8 wherein the predominant proportion of said actinide oxide is thorium oxide.

13. The process of preparing thorium-uranium carbide microspheres 50 to 1000 microns in diameter and containing uranium at a proportion up to 20 mole percent of the total metal values which comprises mixing a hydrous thorium oxide sol containing uranium values at a proportion of the total metal not exceeding 10 mole percent with finely divided carbon, adding to the resulting mixture a uranyl nitrate solution in an amount sufficient to provide a uranium concentration up to 20 mole percent of the total metal, concurrently introducing a fine stream of the resulting carbon-containing sol and a surrounding stream of an organic liquid having a water solubility of 0.3 to 10 volume percent and a solubility in water less than 1 volume percent and containing a surface-active agent into a droplet-forming zone, the flow rate of said organic liquid being substantially higher than the flow rate of said carbon-containing sol and adjusted to a predetermined value in relation to said sol flow rate whereby carbon-containing sol droplets of a predetermined size are formed, passing the resulting droplets downward through a vertically extending congealing zone, countercurrently passing a second stream of said organic liquid upward through said congealing zone, the dimensions of said congealing zone and the flow rate of said second stream being adjusted to maintain the resulting congealing microspheres in suspension until the density of the microspheres increases to a predetermined value, whereby the resulting fully congealed microspheres settle, recovering said fully congealed microspheres, and firing said congealed microspheres at an elevated temperature in a non-oxidizing atmosphere whereby thorium-uranium carbide microspheres are formed.

14. A process for making inorganic microspheres from a stable hydrosol comprising forming said hydrosol into droplets in an organic liquid having a water solubility of 0.3 to 10 volume percent and a solubility in water less than 1 volume percent and containing a surface-active agent, maintaining the resulting droplets in contact with said liquid until said droplets are congealed and recovering the resulting congealed spherical particles.

15. A process for making actinide oxide or actinide carbide microspheres from a stable hydrous actinide sol comprising concurrently introducing into a droplet forming and congealing zone a fine stream of said sol and a surrounding stream of an organic liquid having a water solubility of 0.3 to 10 volume percent and a solubility in water less than 1 volume percent and containing a surface-active agent, the flow rate of said organic liquid being substantially higher than the flow rate of said sol, and recovering the resulting congealed microspheres.

References Cited by the Examiner

AECD—TID–11494, April 1960.

L. DEWAYNE RUTLEDGE, *Primary Examiner.*

S. TRAUB, *Assistant Examiner.*